United States Patent [19]
Yosef

[11] Patent Number: 5,937,029
[45] Date of Patent: Aug. 10, 1999

[54] DATA LOGGING SYSTEM EMPLOYING M[N+1] REDUNDANCY

[75] Inventor: Ilan Yosef, Shmuel, Israel

[73] Assignee: Nice Systems, Ltd., Tel Aviv, Israel

[21] Appl. No.: 08/691,307

[22] Filed: Aug. 2, 1996

[51] Int. Cl.$^6$ .............................. H04M 1/24; H04M 3/08; H04M 2/22

[52] U.S. Cl. ........................ 379/1; 379/2; 379/8; 379/15; 379/279; 370/217

[58] Field of Search ..................................... 379/1, 2, 8, 9, 379/10, 14, 15, 26, 28, 32, 34, 191, 207, 219, 268, 279, 333, 269; 370/217, 219, 220, 241, 242, 244, 250, 221; 395/182.02, 182.04, 182.05

[56] References Cited

U.S. PATENT DOCUMENTS

| | | |
|---|---|---|
| 4,338,494 | 7/1982 | Theis . |
| 4,371,752 | 2/1983 | Matthews et al. . |
| 4,580,012 | 4/1986 | Matthews et al. . |
| 4,581,486 | 4/1986 | Matthews et al. . |
| 4,585,906 | 4/1986 | Matthews et al. . |
| 4,602,129 | 7/1986 | Matthews et al. . |
| 4,640,991 | 2/1987 | Matthews et al. . |
| 4,694,483 | 9/1987 | Cheung . |
| 4,763,353 | 8/1988 | Canale et al. . |
| 4,815,120 | 3/1989 | Kosich . |
| 4,860,333 | 8/1989 | Bitzinger et al. ........................ 379/10 |
| 4,870,678 | 9/1989 | Adachi . |
| 4,918,722 | 4/1990 | Duehren et al. . |
| 4,922,348 | 5/1990 | Gillon et al. . |
| 4,924,488 | 5/1990 | Kosich . |
| 4,994,926 | 2/1991 | Gordon et al. . |
| 5,003,583 | 3/1991 | Iggulden et al. . |
| 5,068,888 | 11/1991 | Scherk et al. . |
| 5,070,497 | 12/1991 | Kleine-Altekamp ............... 340/825.06 |
| 5,090,049 | 2/1992 | Chen . |
| 5,095,373 | 3/1992 | Hisano . |
| 5,119,366 | 6/1992 | Ardon et al. ............................ 379/242 |
| 5,187,704 | 2/1993 | Shimada et al. . |
| 5,189,525 | 2/1993 | Kotani . |
| 5,210,789 | 5/1993 | Jeffus et al. . |
| 5,218,600 | 6/1993 | Schenkyr et al. ........................ 370/217 |

(List continued on next page.)

OTHER PUBLICATIONS

"Quality Must be Seen and Heard" — Steve McNamara—Inbound/Outbound Magazine–Dec. 1989 –pp. 66–67.
"Keeping an Eye on Your Agents" — Madeline Bodin—Call Center Magazine—Feb. 1993 –pp. 32–35.
"Aspect CallCenter Product Specification" — Aspect Telecommunications Corporation—May 23, 1988.

*Primary Examiner*—Curtis A. Kuntz
*Assistant Examiner*—Binh K. Tieu
*Attorney, Agent, or Firm*—McDermott, Will & Emery

[57] ABSTRACT

A novel logging system employing M[(N+1] redundancy is disclosed having applications in recording both voice and facsimile transactions. The logging system includes M chains of N+1 loggers. Each N+1 chain includes N working loggers and a single spare logger. Within each chain, each working logger is coupled to a switch unit. Each switch unit is coupled between a group of input telephone lines and one working logger. The switch units are coupled to each other in a serial daisy chain fashion. The switch furthest downstream is coupled to a spare logger which is activated in the event one the working loggers fails. The switches include watchdog circuitry to detect the failure of a working logger. Once detected, the telephone lines coupled to the failed logger are rerouted to the spare logger. The system can support any number of working loggers by sectioning the working loggers into separate chains. Each chain includes a group of N working loggers covered by a single spare logger. The working loggers and the spare logger are managed by a controller which is coupled thereto via a local area network (LAN). The switch includes a plurality of 2×2 crossover switches which perform the actual switching function in the event a failure is detected in one of the working loggers. Each input telephone line is associated with one 2×2 crossover switch.

19 Claims, 5 Drawing Sheets

U.S. PATENT DOCUMENTS

| | | |
|---|---|---|
| 5,270,830 | 12/1993 | Suzuki . |
| 5,287,199 | 2/1994 | Zoccolillo . |
| 5,291,302 | 3/1994 | Gordon et al. . |
| 5,291,546 | 3/1994 | Giler et al. . |
| 5,296,934 | 3/1994 | Ohtsuki . |
| 5,299,260 | 3/1994 | Shaio . |
| 5,317,628 | 5/1994 | Misholi et al. . |
| 5,321,394 | 6/1994 | Carlton et al. ............ 370/220 |
| 5,323,450 | 6/1994 | Goldhagen et al. . |
| 5,357,562 | 10/1994 | Metser et al. . |
| 5,367,564 | 11/1994 | Sutoh et al. . |
| 5,438,433 | 8/1995 | Reifman et al. . |
| 5,452,106 | 9/1995 | Perkins . |
| 5,459,584 | 10/1995 | Gordon . |
| 5,488,651 | 1/1996 | Giler et al. . |
| 5,509,065 | 4/1996 | Fitzgerald ............ 379/279 |
| 5,519,507 | 5/1996 | Subramaniam et al. . |
| 5,535,256 | 7/1996 | Maloney et al. . |
| 5,596,569 | 1/1997 | Madonna et al. ............ 370/217 |
| 5,614,300 | 3/1997 | Cicali et al. . |
| 5,629,925 | 5/1997 | Pfeiffer et al. ............ 370/217 |

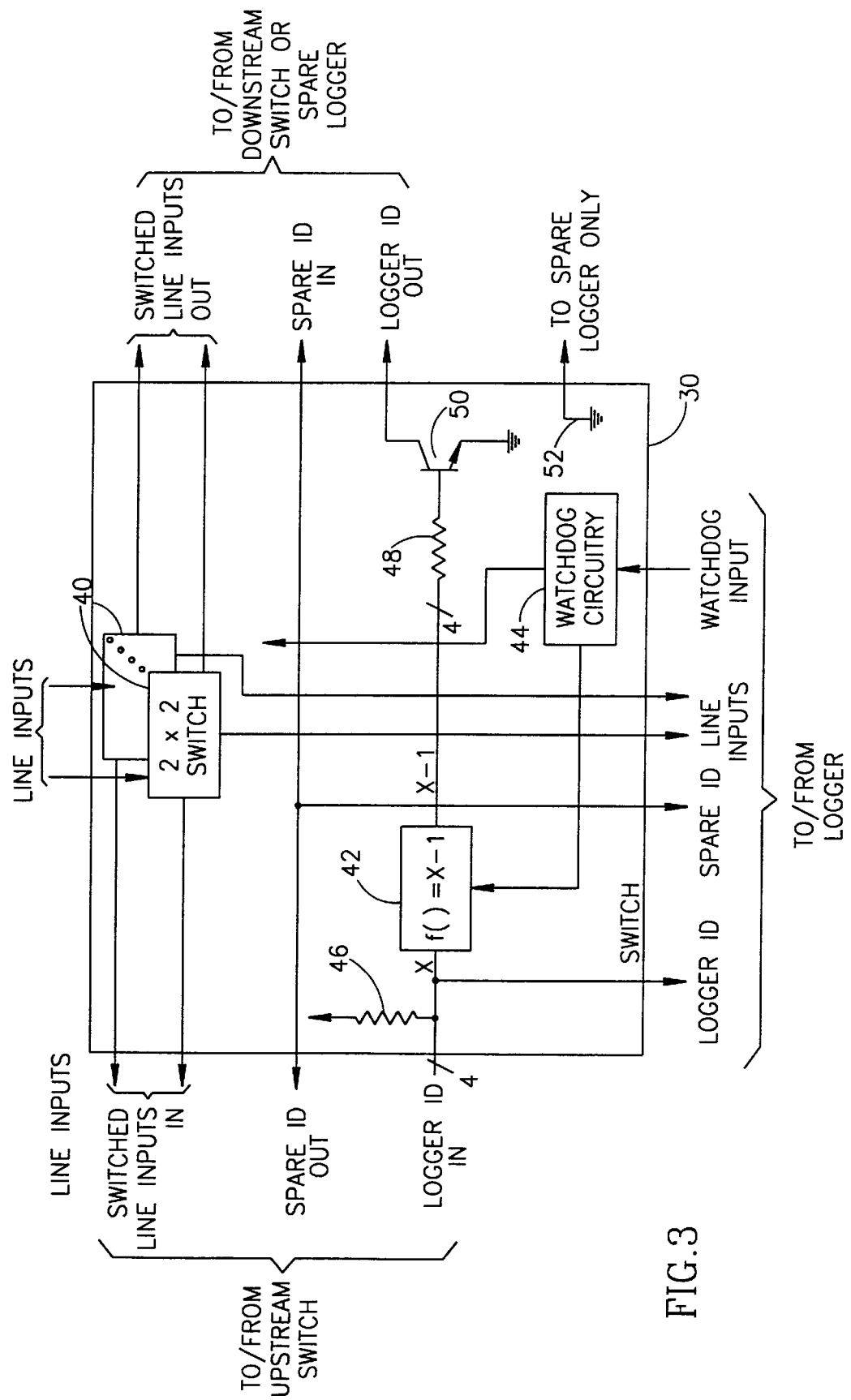

DATA LOGGING SYSTEM EMPLOYING M[N+1] REDUNDANCY

FIELD OF THE INVENTION

The present invention relates generally to data loggers and more particularly relates to data loggers incorporating hardware redundancy.

BACKGROUND OF THE INVENTION

Data loggers for recording telephone calls received over one or more incoming telephone lines are known in the art. Data logging systems exist to record voice telephone calls and fax transmissions. An example of a prior art data logging system, generally referenced 20, is illustrated in FIG. 1. The system 20 is utilizes a local area network (LAN) 28 for communications between loggers 24 and a controller 26. Each logger 24 is responsible for recording communications on a plurality of input telephone lines. In order to provide backup logging capabilities in the event a logger fails, spare loggers 22 are provided. Each logger 24 has associated with it a spare logger 22 that is kept ready for use in the event its associated main logger 24 fails. In order to provide logging service in the event logger 24 fails, each spare logger 22 is also coupled to both the plurality of input telephone lines and the LAN 28. When a logger fails, its spare takes over and continues to log calls.

A disadvantage of this prior art logging system is that it is very wasteful of hardware resources. Redundancy is achieved at the high cost of providing a spare logger for each logger. Using this prior art redundancy scheme, every system that is to have failure protection is encumbered with 100% redundancy overhead which almost doubles the cost of each system. On large systems this is very inefficient and very costly to implement since for the majority of the time the spare loggers are not in use.

SUMMARY OF THE INVENTION

Accordingly, it is an object of the present invention to provide a data logging system that avoids the inefficiencies of prior art redundant logging systems.

It is another object of the present invention to provide a data logging system wherein a spare logger is assigned to a group of more than one logger.

Another object of the present invention is to provide a data logging system wherein the spare logger can take perform the operations of any logger within its assigned group in the event one of the loggers fails.

Yet another object of the present invention is to provide a data logging system wherein the telephone line inputs for the failed logger are automatically switched to the spare logger in the event of a failure.

Another object of the present invention is to provide a data logging system wherein the spare logger is able to replace the failed logger and have knowledge of the failed logger's line names, unit setup and archive media.

Yet another object of the present invention is to provide a data logging system capable of hot replacement of the failed logger without disrupting recording of transmissions.

The present invention discloses a logging system employing M[N+1] redundancy which has applications in the recording of both voice and facsimile transactions. The logging system includes M chains of N+1 loggers. Each N+1 chain includes N working loggers and a single spare logger. Within each chain, each working logger is coupled to a switch unit. Each switch unit is coupled between a group of input telephone lines and one working logger. The switch units are coupled to each other in a serial daisy chain fashion. The switch furthest downstream is coupled to a spare logger which is activated in the event one the working loggers fails. The switches include watchdog circuitry to detect the failure of a working logger. Once detected, the telephone lines coupled to the failed logger are rerouted to the spare logger. The system can support any number of working loggers by sectioning the working loggers into separate chains. Each chain includes a group of N working loggers covered by a single spare logger. The working loggers and the spare logger are managed by a controller which is coupled thereto via a local area network (LAN). The switch includes a plurality 2×2 crossover switches which perform the actual switching function in the event a failure is detected in one of the working loggers. Each input telephone line is associated with one 2×2 crossover switch.

There is therefore provided, in accordance with a preferred embodiment of the present invention, a data logging system employing redundancy for recording transmissions occurring over a plurality of input telephone lines, the data logging system comprising N switch units, each switch unit coupled to a portion of the plurality of input telephone lines, each switch unit having an unswitched state and a switched state, the N switch units coupled together in a daisy chain fashion resulting in a furthest upstream switch unit and a furthest downstream switch unit, N working loggers, each working logger coupled to one of the N switch units, each the working logger recording transmissions occurring over its portion of the plurality of input telephone lines on a recording subsystem coupled thereto while its associated switch unit is the unswitched state, a spare logger coupled to the furthest downstream switch unit, a controller coupled to the N working loggers and the spare logger, the controller for managing and administering the data logging system, and wherein each the switch unit for detecting a failure in an associated working logger, upon detection of the failure the switch unit entering the switched state whereby transmissions occurring over its portion of the plurality of input telephone lines are redirected to the spare logger.

The switch unit comprises a plurality of crossover switches, each crossover switch is associated with one of the input telephone lines, the crossover switch having a first and second input, a first and second output, the first input coupled to the first output and the second input coupled to the second output while the switch is in the unswitched state, the first input is coupled to the second output and the second input is coupled to the first output while the switch is in the switched state.

In addition, the switch unit comprises watchdog circuitry for detecting the failure of its associated working logger and during the failure of the working logger, the transmissions are recorded on the spare logger without interruption to the recording.

Further, during a replacement of a faulty logger with a replacement working logger, the spare logger stops recording and the replacement working logger automatically begins recording the transmission without any interruptions occuring to the recording. Also, the spare logger automatically identifies a failed logger utilizing a logger ID.

The controller automatically sets up the system having knowledge for each working logger, its logger ID and chain ID) and for each spare logger, its chain ID. In the event of a double fault, the working logger closest to the spare logger will be backed up.

There is also provided, in accordance with a preferred embodiment of the present invention, a data logging system employing M[N+1] redundancy for recording transmissions occurring over a plurality of input telephone lines, the data logging system, comprising M chains, each chain comprising: N switch units, each switch unit coupled to a portion of the plurality of input telephone lines, each switch unit having an unswitched state and a switched state, the plurality of switch units coupled together In a daisy chain fashion resulting in a furthest upstream switch unit and a furthest downstream switch unit, N working loggers, each working logger coupled to one of the N switch units, each the working logger recording transmissions occurring over its portion of the plurality of input telephone lines on a recording subsystem coupled thereto while its associated switch unit is in the unswitched state, and a spare logger coupled to the furthest downstream switch unit, wherein each the switch unit for detecting a failure in its associated working logger, upon detection of the failure the switch unit entering tire switched state whereby transmissions occurring over its portion of the plurality of input telephone lines are redirected to the spare logger, a controller coupled, within each the chain, to the N working loggers and the spare logger, the controller for managing and administering the data logging system, and wherein the total number of working loggers across the M chains is equal to M×N.

The switch unit comprises a plurality of crossover switches, each crossover switch is associated with one of the input telephone lines, the crossover switch having a first and second input, a first and second output, the first input is coupled to the first output and the second input is coupled to the second output while the switch is in the unswitched state, the first input is coupled to the second output and the second input is coupled to the first output while the switch is in the switched state.

In addition, each switch unit comprises watchdog circuitry for detecting the failure of its associated working logger and during a replacement of a faulty logger with a replacement working logger, the spare logger stops recording and the replacement working logger automatically begins recording the transmission without any interruptions occurring to the recording.

Further, the spare logger automatically identifies a failed logger utilizing a logger ID and the controller automatically sets up the system having knowledge of: for each of the working loggers, its logger ID and chain ID and for each spare logger, its chain ID.

In addition, in the event of a double fault, the working logger closest to the spare logger will be backed up.

There is also provided, in accordance with a preferred embodiment of the present invention, a M[N+1] data logging system employing M chains, each chain having N working loggers each and one spare logger, the data logging system for recording transmissions occurring over a plurality of input telephone lines, the data logging system comprising M chains, each chain comprising: N switch units, each switch unit coupled to a portion of the plurality of input telephone lines and one of the N working loggers, each switch unit having an unswitched state and a switched state, the N switch units coupled together in a daisy chain fashion resulting in a furthest upstream switch unit and a furthest downstream switch unit, the furthest downstream switch unit coupled to the spare logger, the coupled working logger recording transmissions occurring over the portion of the plurality of input telephone lines while the switch unit is in the unswitched state, and wherein each switch unit detects a failure in its associated working logger, upon detection of the failure the switch unit enters the switched state whereby transmissions occurring over its portion of the plurality of input telephone lines are redirected to the spare logger, a controller coupled, within each chain, to the N working loggers and the spare logger, the controller for managing and administering the data logging system.

In addition, there is provided, in accordance with a preferred embodiment of the present, a method of constructing a data logging system employing redundancy for recording transmissions occurring over a plurality of input telephone lines, the method comprising the steps of providing N switch units, coupling each switch unit to a portion of the plurality of input telephone lines, each switch unit having an unswitched state and a switched state, coupling the N switch units together in a daisy chain fashion resulting in a furthest upstream switch unit and a furthest downstream switch unit, providing N working loggers, coupling each working logger to one of the N switch units, each working logger recording transmissions occurring over its portion of the plurality of input telephone lines on a recording subsystem coupled thereto while its associated switch unit is the unswitched state, coupling a spare logger to the furthest downstream switch unit, coupling a controller to the N working loggers and the spare logger, the controller for managing and administering the data logging system, and detecting a failure, by the switch unit, in an associated working logger and upon detection of the failure the switch unit entering the switched state whereby transmissions occurring over its portion of the plurality of input telephone lines are redirected to the spare logger.

BRIEF DESCRIPTION OF THE DRAWINGS

The invention is herein described, by way of example only, with reference to the accompanying drawings, wherein:

FIG. 3 is a detailed block diagram illustrating the switch of the present invention in more detail;

DETAILED DESCRIPTION OF THE INVENTION

Figure 1:
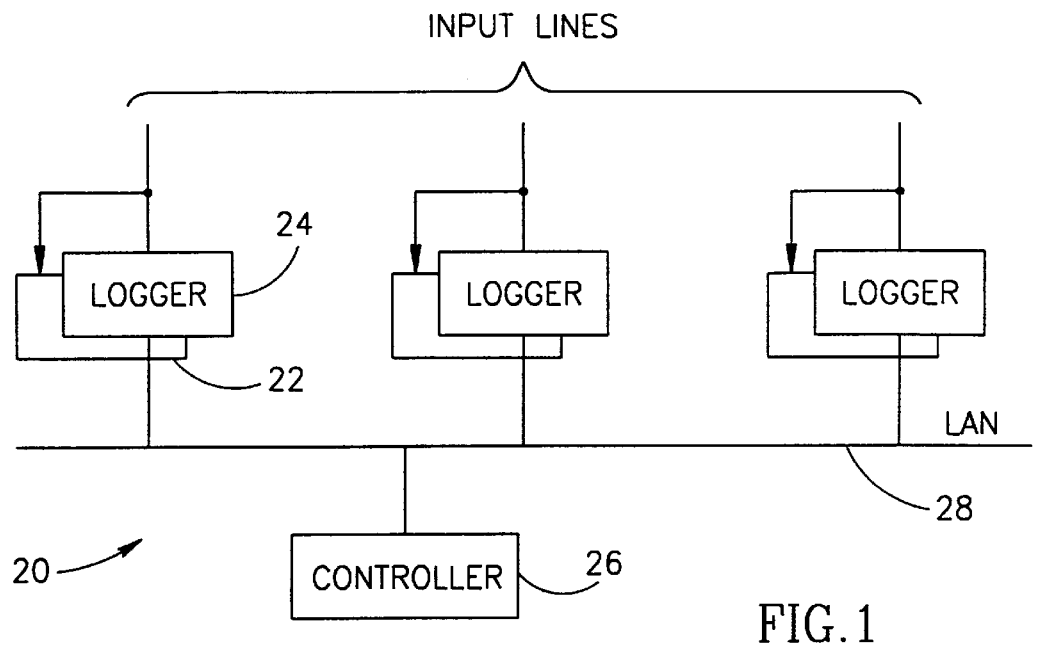
FIG. 1 is a high level block diagram illustrating the fully redundant logging system of the prior art.
Figure 2:
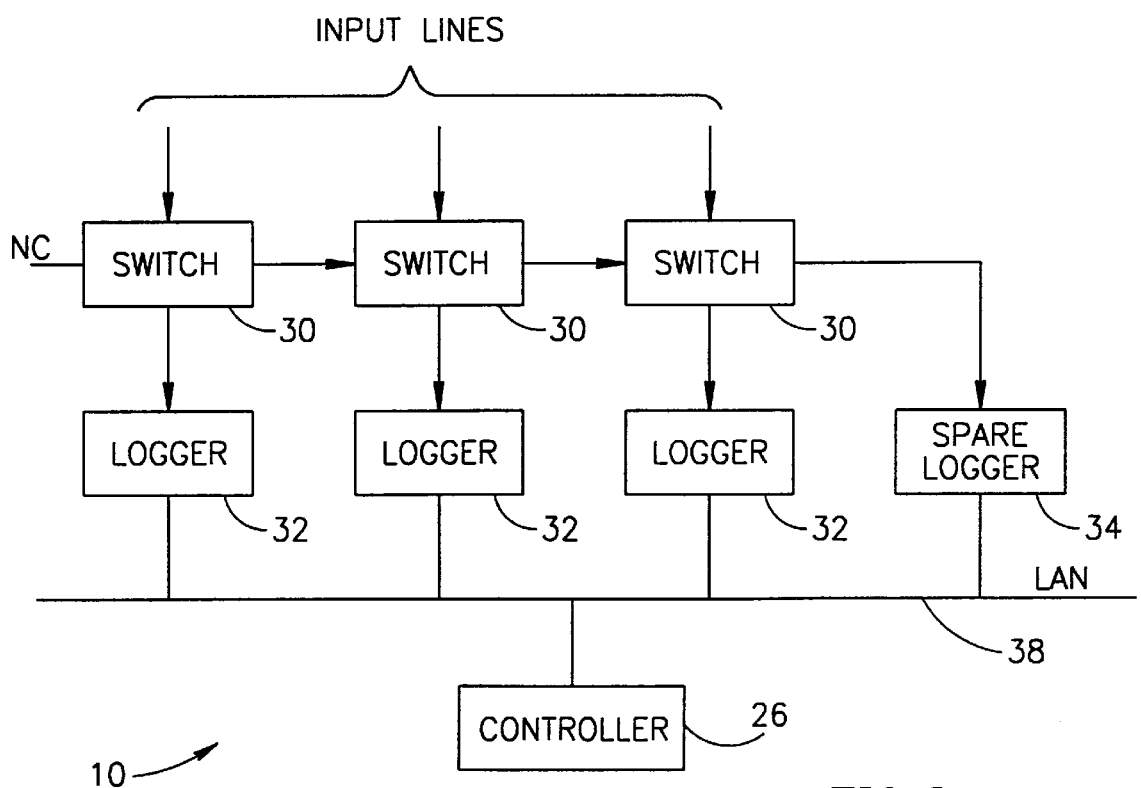
FIG. 2 is a high level block diagram illustrating an M[N+1] redundant logging system constructed in accordance with a preferred embodiment of the present invention.

A high level block diagram illustrating an M[N+1] redundant logging system, generally referenced 10, constructed in accordance with a preferred embodiment of the present invention is shown in FIG. 2. The logging system 10 comprises one or more loggers 32 each coupled to a local area network (LAN) 38. A switch 30 is coupled to each logger and to one or more telephone input lines. The switches can be adapted to handle numerous types of telecommunication lines such as analog input lines, E1/T1 trunk lines, basic rate ISDN, analog audio lines, leased lines, etc. The switches are also connected together one to the next in daisy chain fashion. The first switch on the left has a no connection input and the switch on the right is coupled to the spare logger 34. Loggers 32 are conventional call loggers that have been adapted to operate with switches 30. Coupled to each logger is a recording unit such as a digital audio tape (DAT) recorder or other suitable recording means (not shown). The recording unit may be either built in integral with the logger or supplied as an external unit. In contrast to the fully redundant logger of the prior art (FIG. 1) the logger 10 of the present invention does not require one spare logger per working logger. Rather, a single spare logger covers a group N loggers giving an N+1 configuration. Groups of N+1 loggers, each group referred to as a chain, can be grouped together to form M chains of N+1 loggers, denoted by M[N+1]. A controller 26 functions to supervise and administer the group of M×N working loggers and M spare loggers. It is important to note that, in general, controller 26 is not needed during normal operation in order for the loggers to be able to log transmissions. Initially, controller performs identification and set up functions in order to configure the logging system 10 Controller 26, working loggers 32 and spare logger 34 are coupled to and communicate over LAN 38.

A principle of the present invention is that the switches are normally pass through devices except in the event of a failure. The switches normally pass their input telephone lines through to the logger. In the event of a failure, the switch associated with the failed logger switches its telephone lines to the adjacent switch which subsequently passes the lines through the remaining switches to the spare logger. Although the switches are intelligent devices, they are not complicated devices and should be able to manufactured inexpensively reducing the cost of adding redundancy to a logging system.

A detailed block diagram illustrating the switch 30 of the present invention in more detail is shown in FIG. 3. With reference to FIGS. 2 and 3, the operation of the logging system will now be described in further detail. As stated previously, each working logger is coupled to its own switch. Switch 30 comprises a plurality of 2×2 crossover switches 40, a processing unit 42 for calculating the mathematical function f(x)=x−1 and watchdog timer circuitry 44. Each 2×2 crossover switch comprises two input terminals and two output terminals. Each input telephone line is coupled to one of the 2×2 crossover switches via one of its inputs and, in the absence of a failure, is fed through the switch to the logger via one of the output ports. In practice, a logger may be recording transmissions for fifty or more input telephone lines and each input telephone is coupled to a separate 2×2 crossover switch.

The case when a switch is situated between two switches will now be described, The switched input lines from the upstream switch are coupled to the second input of the switch. In FIG. 2, the upstream switch is the switch to the left of a switch. The switch furthest upstream is the switch with the no connection (NC) at its input (leftmost switch in FIG. 2). Conversely, the downstream switch is the switch to the right of the switch. The second output is the switched line inputs that are fed to the downstream switch. Normally, in the absence of a failure, the switched line inputs from the upstream switch are fed through to the downstream switch. The spare logger outputs a spare ID which is always fed through to upstream switches by each switch. The spare ID is also provided to each logger via its switch. In addition, a logger ID is input from the upstream switch and input to processing unit 42 and to the logger itself. Processing unit 42 functions to subtract one from the logger ID and output the result to the downstream switch. Thus, if the logger ID is represented by X, the value output by processing unit 42 is X−1. The logger ID is a four bit number with each bit pulled high by resistors 46 at the input. Each bit output by processing unit 42 is input to the base of an NPN transistor 50 through a series resistor 48, The open collector output of transistors 50 are input to the downstream switch. Thus, the collectors of the transistors 50 of an upstream switch in combination with the pull-up resistors 46 of a downstream switch provide the inputs to the processing unit of the downstream unit.

Watchdog timer circuitry 44 is coupled to the logger associated with the particular switch and periodically receives a watchdog input. The function of the watchdog timer is to constantly check for the failure of the logger. The operation of the logging system in the event of a failure will be described in more detail below.

In the case when the switch is the furthest upstream switch, the switched line inputs to each 2×2 crossover switch 40 is a no connection. The spare ID output is also not connected and the input to the logger ID input is a no connection (NC) (FIG. 2). The switch which is the furthest downstream switch is the switch coupled to the spare logger (FIG. 2). The spare logger is identical to the working loggers 32 during operation. Software within the spare logger determines whether it is a working logger or a spare logger. The spare logger has an input for a logger ID, line input and a spare logger designation input. In addition, the spare logger outputs the spare ID. The switch furthest downstream outputs to the spare logger a switched line input, logger ID and the spare logger designation input 52 (FIG. 3). Only the furthest downstream switch grounds its spare logger designation signal. This signal is used by the logger designated as the spare to identify itself as the spare logger. The spare logger outputs the spare ID which is sent through the upstream switch path.

Figure 4A:
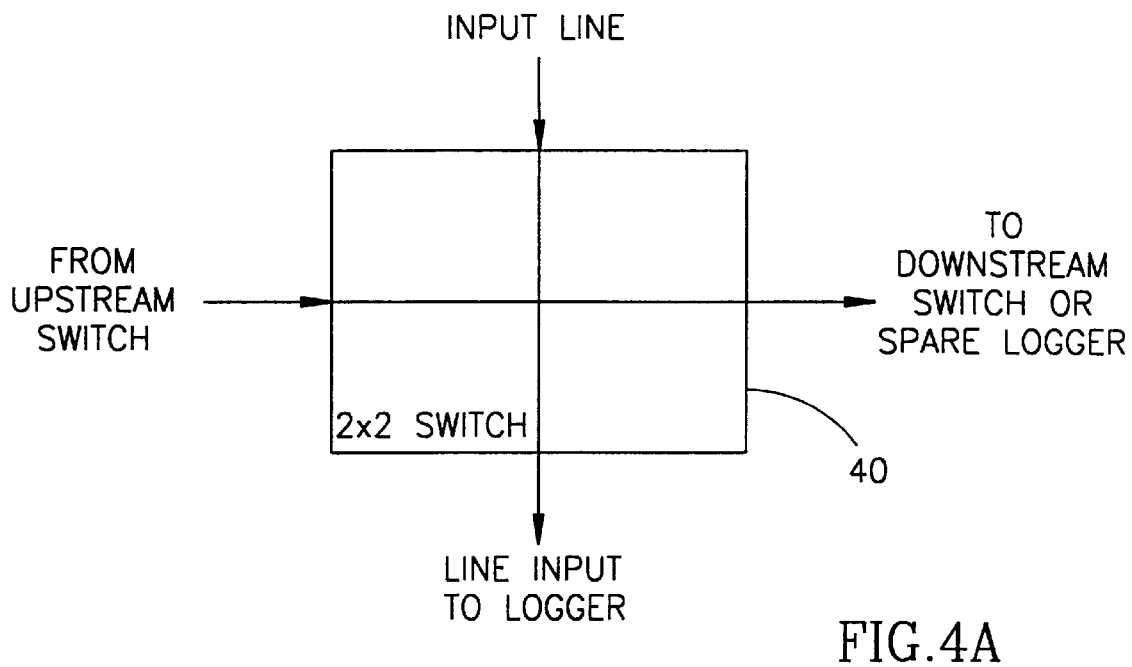
FIG. 4A is a detailed block diagram illustrating the 2×2 crossover switch in an unswitched state.

A detailed block diagram illustrating the 2×2 crossover switch 40 in an unswitched state is shown in FIG. 4A. As described previously, one input to the 2×2 crossover switch is one of the telephone input lines, the other input is one of the switch line inputs from the upstream switch. In the absence of a failure (i.e., normal operating conditions) the switched line input in signal is fed straight through to the downstream switched line input out signal and the input telephone line is fed straight through to the line input of the logger.

Figure 4B:
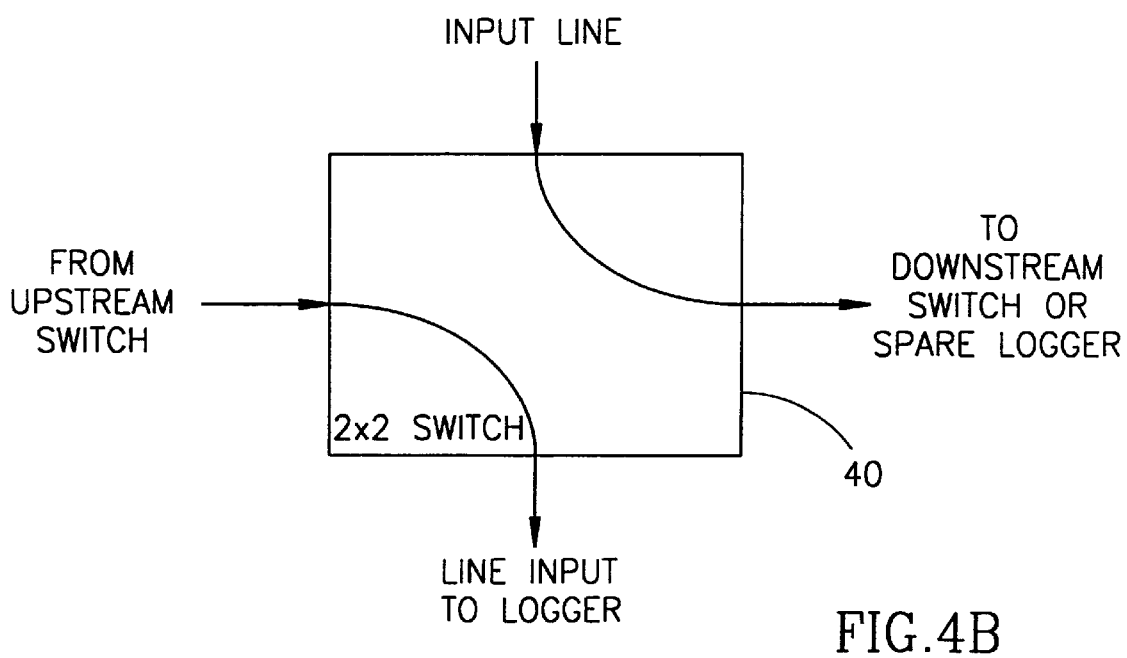
FIG. 4B is a detailed block diagram illustrating the 2×2 crossover switch in a switched state.

The operation of the logging system in the event of a failure will now be described in more detail with reference to FIGS. 2 through 4B. A failure is detected when a response is not received by the watchdog timer circuitry in the switch from its associated logger within the required time. Each logger supplies power to its respective switch unit. A logger power failure treated the same as if the watchdog timer detected a logger failure. This may be caused by a hardware or software failure or by a power supply failure in the logger, for example. Once a failure is detected, the watchdog timer then initiates the process of taking the failed logger off-line and cutting over to the spare logger. The process is initiated with the watchdog circuitry sending a signal to the processing unit 42 instructing it to output all one's on its output lines rather than the value of the logger ID minus one. The watchdog timer circuitry also causes all the 2×2 crossover switches to switch from the unswitched state to the switched state. Shown in FIG. 4B is a detailed block diagram illustrating the 2×2 crossover switch 40 in a switched state. In the switched state, the input telephone lines are diverted from the failed logger to the switched line inputs in of the downstream switch via the switched line inputs out. Assuming only one logger failed in the system, the remaining downstream switches pass the telephone input lines through to the spare logger. In similar fashion, the switched line inputs in are optionally switched to the failed logger line inputs. Diverting the switched line inputs in is not necessary for the operation of the present invention.

The spare logger thus receives the telephone line inputs that were input to the logger that failed. In addition, the logger ID received by the spare logger indicates the identity of the failed logger. The value of the logger ID received by the spare logger indicates how far away the failed logger is from the spare logger. The spare logger calculates the value of hexadecimal F minus the logger ID received it receives to obtain the location of the failed logger. The value of hexadecimal F minus the logger ID received indicates how many devices away from the spare logger the failed logger is located.

In the event of a failure, the spare logger immediately and automatically begins recording transmissions occurring on the failed logger's input telephone lines. The faulty logger can be replaced while transmissions are recorded on the spare logger and without interference to the recording. Once the failed logger is fixed or replaced, it is brought back on-line automatically (i.e., hot replacing) and seamlessly begins recording transmissions without a gap in recording. The switch associated with the previously failed logger senses that its logger is operative and switches all its 2×2 crossover switches to the unswitched state, diverting the input telephone lines back to the working logger. In addition, the processing unit ceases putting all ones on the logger ID line and resumes calculating its function of logger ID minus one. Once the spare logger senses the original logger ID has been reestablished, the spare logger ceases to record and returns to the idle state.

The spare logger has stored within it the configuration of each of the working loggers it is covering for. Initially, during a setup period, the controller 26 (FIG. 2) interrogates each working logger and obtains configuration information about each one. This information is transferred to and stored in the spare logger. The controller communicates with the working loggers and the spare logger over LAN 38. It is important to note that the controller is not needed for the system to be able to record. The watchdog function performed by the switch does not require the controller or the LAN to be operative. Recording still continues in the event the controller and/or the LAN become inoperative. This redundancy scheme increases the reliability of the system.

Figure 5:
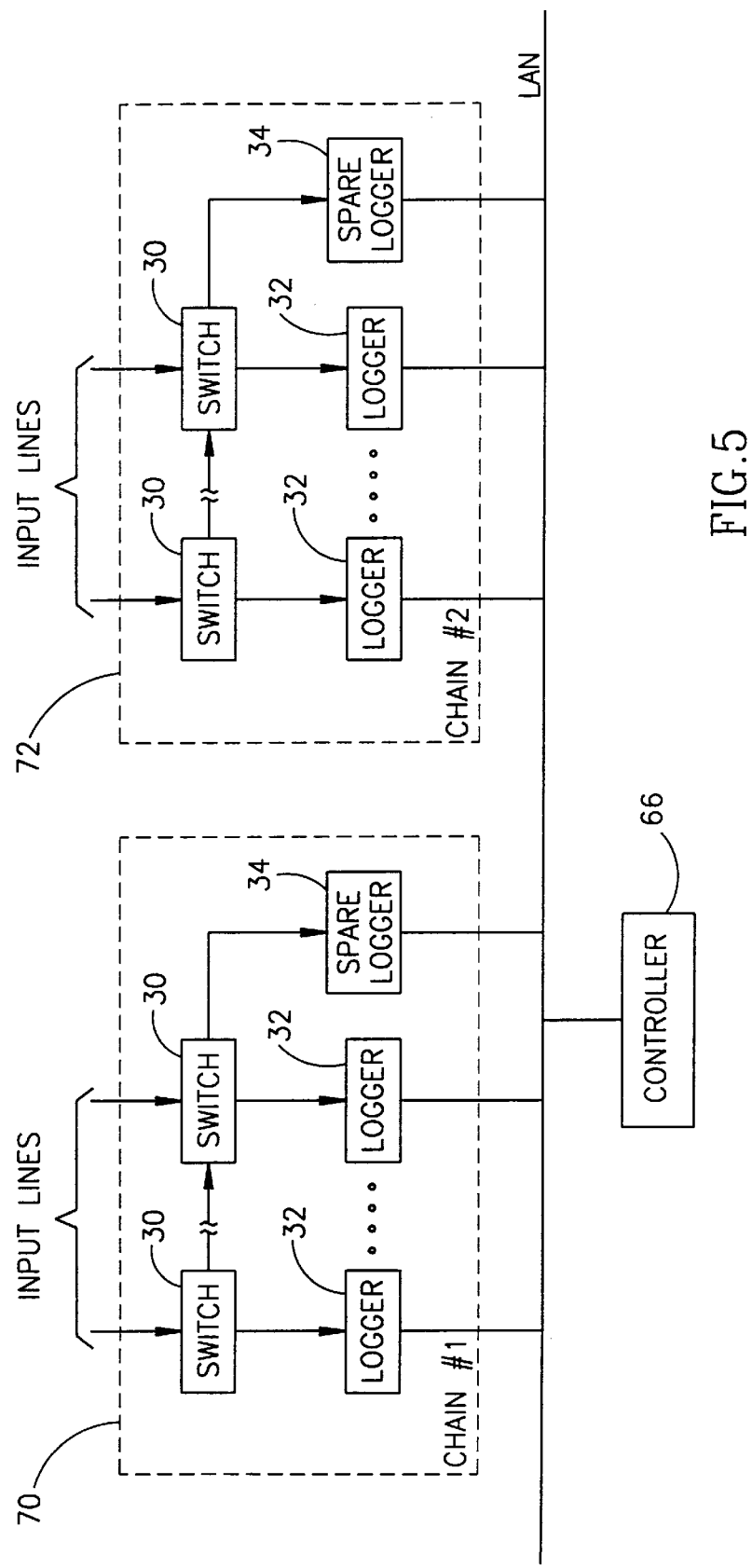
FIG. 5 is a high level block diagram illustrating a logging system incorporating two logger chains (i.e., 2[N+1]) constructed in accordance with a preferred embodiment of the present invention.

As stated previously, the redundant logging system of the present invention is an M[N+1] type system. This means there are M×N working loggers protected against failure by M spare loggers. Preferably, one spare logger should be allocated to every 10 to 12 working loggers in order to achieve a reasonable level of reliability. To incorporate more than one spare logger into the system, separate chains must be constructed. A high level block diagram illustrating a logging system incorporating two logger chains, denoted by 2[N+1], constructed in accordance with a preferred embodiment of the present invention is shown in FIG. 5. Each chain, chain #1 70 and chain #2 72, comprises one or more working loggers 32, a switch 32 associated with each working logger and a single spare logger 34. Only a single controller is required to administer and manage the entire logging system over the LAN. The controller functions to setup the system and has knowledge of each logger's logger ID and chain ID and for each spare, its chain ID. Each chain 70, 72 in the system operates similarly to the system described with reference to FIG. 2. Each switch is daisy chained to its downstream switch and receives the input telephone lines for its associated working logger.

Note that each chain can only support one spare logger. In the case of a double fault, it is uniquely determined which faulty logger will be backed up. The faulty logger that is closest to the spare in the chain (i.e., furthest downstream) will be backed up. Thus, a priority among the input lines or audio channels can be defined for backup purposes.

Figure 6:
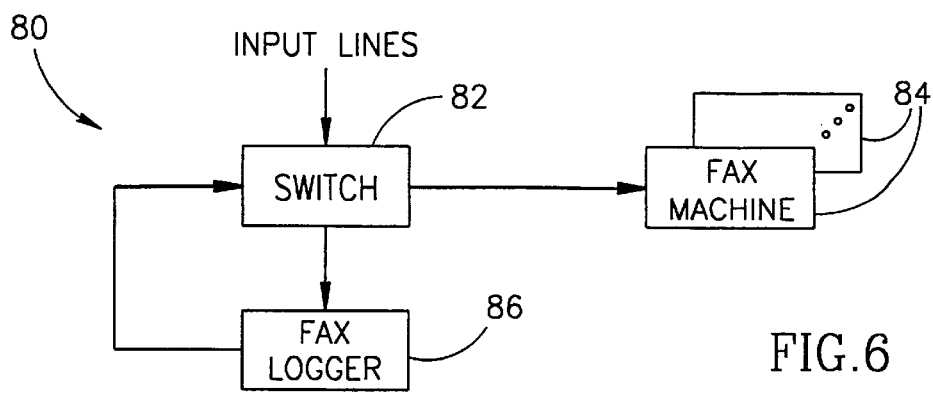
FIG. 6 is a block diagram illustrating the logging system of the present invention adapted to log facsimile transmissions to and from a plurality of facsimile machines.

In addition to handling voice communications, the logging system of the present invention can be adapted to log facsimile transmission as well. With reference to FIGS. 6 through 7B, the operation of the logging system of the present invention to facsimile equipment will now be described. A block diagram illustrating the switch portion of the logging system of the present invention adapted to log facsimile transmissions to and from a plurality of facsimile machines is shown in FIG. 6. In this embodiment, the switch 82 of the present invention is coupled with a conventional fax logger 86. One or more fax lines are coupled to one of the two inputs to the switch 82. The second input is coupled to the fax logger 86. One output of the switch is also coupled to the fax logger and the second output is coupled to one or more fax machines 84 or other facsimile capable devices. For example, fax machine 84 may comprise a multiline capable fax machine. Each fax input line is associated with a fax machine 84. Similar to the logging system for logging audio transmissions described earlier, the switch unit 82 comprises a plurality of 2×2 crossover switches, each crossover switch assigned to one fax input line.

Figure 7A:
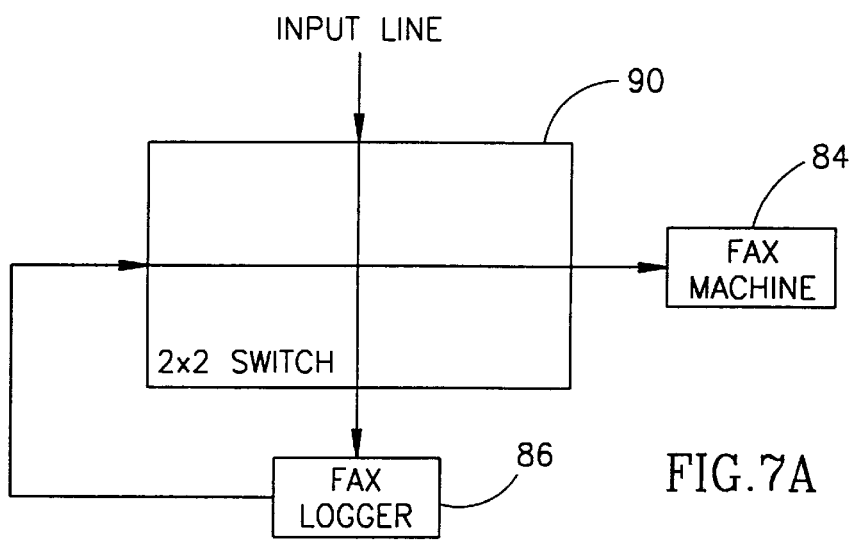
FIG. 7A is a block diagram illustrating the 2×2 crossover switch in the unswitched state coupling the input line to the facsimile logger.
Figure 7B:
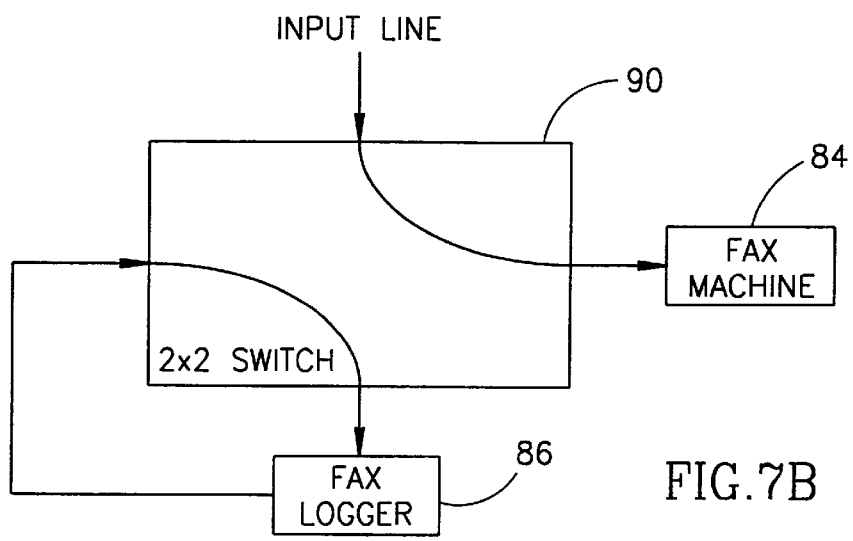
FIG. 7B is a block diagram illustrating the 2×2 crossover switch in the switched state coupling the input line directly to the facsimile machine.

A block diagram illustrating the 2×2 crossover switch within switch 82 in the unswitched state coupling the input line to the facsimile logger is shown in FIG. 7A. The unswitched state is the normal operating state in the absence of a failure. In this state) the input fax line is fed through the 2×2 crossover switch 90 to the fax logger 86. The output of the fax logger 86 is input to the second input of the 2×2 crossover switch and is fed through to the output which, in turn, is coupled to fax machine 84. Used as a system for logging facsimile transmissions, the fax logger is placed in the communication path between the fax machines and the input fax lines. This is done so as to allow logging of both incoming and outgoing facsimile transmissions. Outbound facsimiles from the fax machines 84 must also path through fax logger 86 where they are recorded before being placed on the fax input lines.

A block diagram illustrating the 2×2 crossover switch in the switched state coupling the input line directly to the facsimile machine is shown in FIG. 7B. In the event of a failure in the fax logger 86, each the 2×2 crossover switch 90 switches its input line directly to its associated fax machine 84. As an option, the fax logger 86 output can be coupled to its input. The connectivity of the fax logger in the event of a failure, however, is not critical. What is critical is that the fax input lines bypass the failed fax logger 86 and be input directly to the fax machines 84. The switched state of the 2×2 crossover illustrated in FIG. 7B is also applicable for the fax logger in performing self tests. Fax logger output can be simulated and input to itself through the 2×2 crossover switch. Alternatively, the switch can be adapted to provided simulated input to the fax logger.

While the invention has been described with respect to a limited number of embodiments, it will be appreciated that many variations, modifications and other applications of the invention may be made.

What is claimed is:

1. A data logging system employing redundancy for recording transmissions occurring over a plurality of input telephone lines, said data logging system comprising:
   N switch units, each switch unit coupled to a portion of said plurality of input telephone lines, each switch unit having an unswitched state and a switched state, said N switch units coupled together in a daisy chain fashion resulting in a furthest upstream switch unit and a furthest downstream switch unit;
   N working loggers, each working logger coupled to one of said N switch units, each said working logger recording transmissions occurring over its portion of said plurality of input telephone lines on a recording subsystem coupled thereto while its associated switch unit is said unswitched state;
   a spare logger coupled to said furthest downstream switch unit;
   a controller coupled to said N working loggers and said spare logger, said controller for managing and administering said data logging system;
   wherein each said switch unit for detecting a failure in an associated working logger, upon detection of said failure said switch unit entering said switched state whereby transmissions occurring over its portion of said plurality of input telephone lines are redirected to said spare logger; and
   wherein each said switch unit is connected in series fashion between a portion of said plurality of input telephone lines and one of said working loggers such that input signals on said input telephone lines pass through the switch unit during normal operation in which there is no failure of a working logger.

2. The data logging system according to claim 1, wherein said switch unit comprises a plurality of crossover switches, each said crossover switch associated with one of said input telephone lines, said crossover switch having a first and second input, a first and second output, said first input coupled to said first output and said second input coupled to said second output while said switch is in said unswitched state, said first input coupled to said second output and said second input coupled to said first output while said switch is in said switched state.

3. The data logging system according to claim 1, wherein each said switch unit comprises watchdog circuitry for detecting the failure of its associated working logger.

4. The data logging system according to claim 1, wherein during said failure of said working logger, said transmissions are recorded on said spare logger without interruption to said recording.

5. The data logging system according to claim 1, wherein during a replacement of a faulty logger with a replacement working logger, said spare logger stops recording and said replacement working logger automatically begins recording said transmission without any interruptions occurring to said recording.

6. The data logging system according to claim 1, wherein said spare logger automatically identifies a failed logger utilizing a logger ID.

7. The data logging system according to claim 1, wherein said controller automatically sets up said system having knowledge for each said working logger, its logger ID and chain ID and for each said spare logger, its chain ID.

8. The data logging system according to claim 1, wherein in the event of a double fault, the working logger closest to said spare logger will be backed up.

9. A data logging system employing M[N+1] redundancy for recording transmissions occurring over a plurality of input telephone lines, said data logging system comprising:
   M chains;
   each chain comprising:
      N switch units, each switch unit coupled to a portion of said plurality of input telephone lines, each switch unit having an unswitched state and a switched state, said plurality of switch units coupled together in a daisy chain fashion resulting in a furthest upstream switch unit and a furthest downstream switch unit;
      N working loggers, each working logger coupled to one of said N switch units, each said working logger recording transmissions occurring over its portion of said plurality of input telephone lines on a recording subsystem coupled thereto while its associated switch unit is in said unswitched state; and
      a spare logger coupled to said furthest downstream switch unit;
      wherein each said switch unit for detecting a failure in its associated working logger, upon detection of said failure said switch unit entering said switched state whereby transmissions occurring over its portion of said plurality of input telephone lines are redirected to said spare logger;
      wherein each said switch unit is connected in series fashion between a portion of said plurality of input telephone lines and one of said working loggers such that input signals on said input telephone lines pass through the switch unit during normal operation in which there is no failure of a working logger;
   a controller coupled, within each said chain, to said N working loggers and said spare logger, said controller for managing and administering said data logging system; and
   wherein the total number of working loggers across said M chains is equal to M×N.

10. The data logging system according to claim 9, wherein said switch unit comprises a plurality of crossover switches, each said crossover switch associated with one of said input telephone lines, said crossover switch having a first and second input, a first and second output, said first input coupled to said first output and said second input coupled to said second output while said switch is in said unswitched state, said first input coupled to said second output and sad second input coupled to said first output while said switch is in said switched state.

11. The data logging system according to claim 9, wherein each said switch unit comprises watchdog circuitry for detecting the failure of its associated working logger.

12. The data logging system according to claim 9, wherein during a replacement of a faulty logger with a replacement working logger, said spare logger stops recording and said replacement working logger automatically begins recording said transmission without any interruptions occurring to said recording.

13. The data logging system according to claim 9, wherein said spare logger automatically identifies a failed logger utilizing a logger ID.

14. The data logging system according to claim 9, wherein said controller automatically sets up said system hang knowledge for each said working logger, its logger ID and chain ID and for each said spare logger, its chain ID.

15. The data logging system according to claim 9, wherein in the event of a double fault, the working logger closest to said spare logger will be backed up.

16. An M[N+1] data logging system employing M chains, each chain having N working loggers each and one spare logger, said data logging system for recording transmissions occurring over a plurality of input telephone lines, said data logging system comprising:

M chains;

each chain comprising:

N switch units, each switch unit coupled to a portion of said plurality of input telephone lines and one of said N working loggers, each switch unit having an unswitched state and a switched state, said N switch units coupled together in a daisy chain fashion resulting in a furthest upstream switch unit and a furthest downstream switch unit, said furthest downstream switch unit coupled to said spare logger, said coupled working logger recording transmissions occurring over said portion of said plurality of input telephone lines while said switch unit is in said unswitched state; and wherein each said switch unit for detecting a failure in its associated working logger, upon detection of said failure said switch unit entering said switched state whereby transmissions occurring over its portion of said plurality of input telephone lines are redirected to said spare logger;

wherein each said switch unit is connected in series fashion between a portion of said plurality of input telephone lines and one of said working loggers such that input signals on said input telephone lines pass through the switch unit during normal operation in which there is no failure of a working logger;

a controller coupled, within each said chain, to said N working loggers and said spare logger, said controller for managing and administering said data logging system.

17. The data logging system according to claim 16, wherein said switch unit comprises a plurality of crossover switches, each said crossover switch associated with one of said input telephone lines, said crossover switch having a first and second input, a first and second output, said fist input coupled to said first output and said second input coupled to said second output while said switch is in said unswitched state, said first input coupled to said second output and said second input coupled to said first output while said switch is in said switched state.

18. The data logging system according to claim 16, wherein each said switch unit comprises watchdog circuitry for detecting the failure of its associated working logger.

19. A method of constructing a data logging system employing redundancy for recording transmissions occurring over a plurality of input telephone lines, said method comprising the steps of:

providing N switch units;

coupling each switch unit to a portion of said plurality of input telephone lines, each switch unit having an unswitched state and a switched state;

coupling said N switch units together in a daisy chain fashion resulting in a furthest upstream switch unit and a furthest downstream switch unit;

providing N working loggers;

coupling each working logger to one of said N switch units, each said working logger recording transmissions occurring over its portion of said plurality of input telephone lines on a recording subsystem coupled thereto while its associated switch unit is said unswitched state;

coupling a spare logger to said furthest downstream switch unit;

coupling a controller to said N working loggers and said spare logger, said controller for managing and administering said data logging system; and detecting a failure, by said switch unit, in an associated working logger and upon detection of said failure said switch unit entering said switched state whereby transmissions occurring over its portion of said plurality of input telephone lines are redirected to said spare logger, wherein each said switch unit is connected in series fashion between a portion of said plurality of input telephone lines and one of said working loggers such that input signals on said input telephone lines pass through the switch unit during normal operation in which there is no failure of a working logger.

* * * * *